Patented May 15, 1951

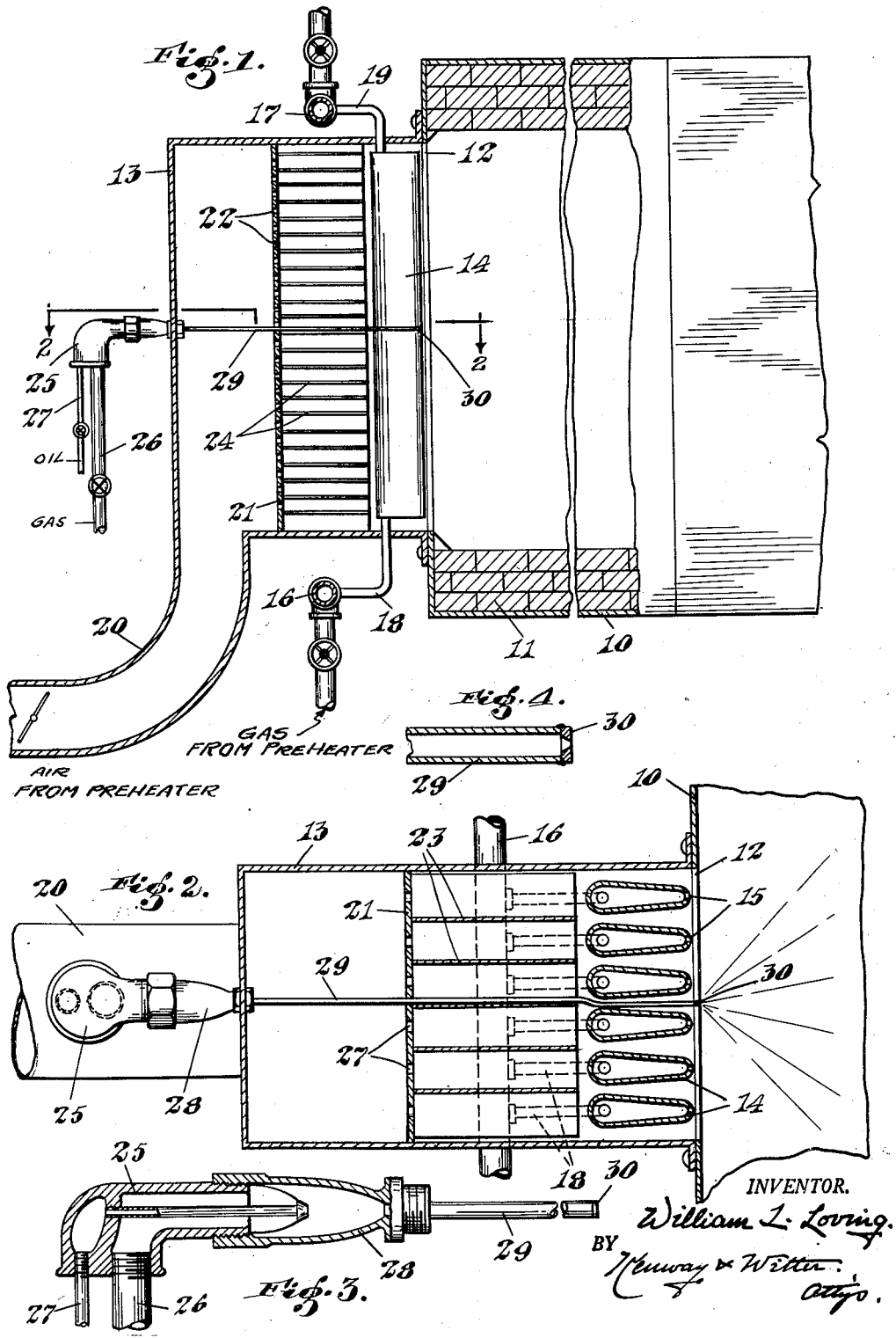

2,553,199

UNITED STATES PATENT OFFICE 2,553,199

MANUFACTURE OF CARBON BLACK

William L. Loving, Pampa, Tex., assignor to Godfrey L. Cabot, Inc., Boston, Mass., a corporation of Massachusetts Application October 29, 1947, Serial No. 782,765

6 Claims. (Cl. 23—209.8)

This invention consists in a novel process of making carbon black of high grade from gas and hydrocarbon oil, and includes within its scope a novel furnace organization whereby the said process may be advantageously carried out.

In a prior application of W. L. Loving, Ser. No. 666,036, filed April 30, 1946, now U. S. Patent No. 2,462,026 dated February 15, 1949, there is disclosed and claimed a process of making carbon black characterized by the steps of flowing a body of air in several adjacent smooth streams into an unobstructed furnace space, and, as the air enters the said space, injecting into the air streams a multiplicity of small well-distributed jets of gas located side by side and initiated substantially in a common plane disposed transverse to the direction of air flow, thereby creating immediately at the entering side of the unobstructed furnace space a turbulent air-gas mixture, burning part of this mixture to create heat to decompose the remainder of the gas and collecting the carbon particles suspended in the products of combustion. This process is useful and of commercial importance in the carbon black industry in that it is efficient, reliable and versatile in the character of the products that may be produced by appropriate control of its air-gas ratio, velocity of flow and other operating conditions.

The process of the present invention is, in one aspect, an improvement upon that disclosed in the said prior application, and in another aspect a process of more general application. It is characterized by supplying to a defined zone of burning air-gas mixture a spray of atomized or vaporized hydrocarbon oil. By this improved process it is entirely practicable to increase the carbon black output by as much as 3 to 4 lbs. per gallon of oil supplied as compared to the output of the process carried out under otherwise identical conditions.

Another important and unexpected advantage of my invention is when the burner is designed and operated to produce a high grade furnace black, such, for example, as SRF or HMF, atomized or vaporized oil may be added and the same quality of black produced at greatly increased production rate. This is the more surprising because if atomized oil alone is injected through a nozzle into a furnace and burned neither SRF nor HMF is produced, but instead the product is of typical oil black quality entirely unlike SRF or HMF.

Moreover, the novel process of my invention is extremely flexible in that it permits a wide variation of operating conditions of which advantage may be taken to maintain a uniform product in spite of changes in the composition of gas available, or to produce carbon black of various properties as the trade may require. For example, my novel process may be operated (1) with preheated gas, (2) with preheated gas enriched with vaporized oil, (3) with preheated gas and atomized oil introduced separately, (4) with preheated gas and vaporized oil introduced separately, or (5) with unheated gas and atomized oil.

These and other features of the invention will be best understood and appreciated from the following description of a preferred embodiment of apparatus which may be employed in carrying out the process, shown in the accompanying drawings in which:

Fig. 1 is a view of a furnace partly in side elevation and partly in vertical section, Fig. 2 is a sectional view on the line 2—2 of Fig. 1, Fig. 3 is a view of the mixing nozzle and its connections, the nozzle being shown in longitudinal section, and Fig. 4 is a detailed sectional view of the oil pipe tip.

As shown in Fig. 1, my novel process may be carried out advantageously in connection with a horizontally disposed furnace comprising a generally rectangular enclosure formed by a sheet steel casing 10 lined with refractory brick 11. An outlet duct (not shown) is provided at the right hand end of the furnace illustrated in Fig. 1. In practice, the furnace may be 12 to 14 feet in length, and accordingly a small part of the furnace only is shown in Fig. 1.

The furnace is provided at its front end with rectangular openings, one opening 12 shaped and adapted to receive an individual burner box being shown in Figs. 1 and 2. Each burner box comprises a sheet metal rectangular casing 13 flanged and bolted to the casing of the furnace. A series of parallel vertically disposed burner pipes 14 is mounted in each burner box. These pipes are shown as being pear-shaped or oval in cross-section and each is provided with a row of gas orifices 15. The pipes 14 are spaced apart to provide air passages of uniform width between them and are arranged with the gas orifices 15 directed into the furnace space. In practice the burner pipes may be machined so that their flat sides may be spaced apart to define air passages of uniform and accurate width, for example ½ inch. The narrow perforated faces of the pipes are directed toward the furnace enclosure.

Gas is supplied to the burner pipes from a lower header 16 and an upper header 17 having individual connections 18 and 19 to the top and bottom of the burner pipes, or in some cases a single header is found adequate. As herein shown, each burner box is equipped with six burner pipes, but the precise number of burner pipes employed is of secondary importance. The gas orifices are in the order of ¼ inch in diameter and may be spaced 1 inch on centers so that a 3 foot burner pipe may be provided with about thirty-three orifices.

Air is supplied to the burner box by a duct 20 which leads upwardly into the chamber provided by the casing 13 and may be provided with a controlling damper. The casing 13 is provided with a transverse baffle plate 21 having perforations 22 which are arranged in vertical rows and may correspond in location to the gas orifices of the burner pipes.

Between the baffle plate 21 and the burner pipes 14 is located an air conducting unit comprising a series of rectangular vertical sheets 23 corresponding in number to the burner pipes, and a series of horizontal sheets 24 corresponding to the number of gas orifices. The sheets 23 and 24 are slotted half way from one edge to the other and brought into interlocking engagement so that they define a nest of rectangular air passages of equal dimensions. The relation of these cells or air passages to the perforations of the baffle plate 21 and to the gas orifices 15 is such that equal volumes of air are directed to each gas orifice and a uniform air-gas distribution is insured throughout the entire area of the opening 12 and the area of the burner pipe assembly. The construction above described is the subject-matter of the prior application of Charles A. Stokes Ser. No. 764,277, filed July 29, 1947, now Patent No. 2,507,580 granted May 16, 1950, and of my own prior Patent No. 2,418,475 granted April 8, 1947.

The present invention in one aspect consists in incorporating in a novel manner into the furnace construction already described, and which has heretofore been employed only to produce carbon black by the decomposition of gas in a burning air-gas mixture, provision for enriching that mixture by vaporized or atomized hydrocarbon oil. To that end is provided a mixing nozzle 25 having a relatively large pipe connection 26 for air, gas or steam, and a relatively small pipe connection 27 for oil. Oil is conducted by the nozzle to the center of an elongated mixing chamber 28. Gas or other vapor is conducted to the outer portion of the chamber 28 with the result that the oil is atomized and then, in atomized condition and mixed with gas, is delivered through the discharge pipe 29 to the furnace enclosure. The pipe 29 is passed into the casing 13 of the burner box through the baffle plate 21 and one cell of the air conducting unit, and thence between the two center burner pipes in a direction substantially perpendicular to the plane in which the gas orifices 15 are located. The discharge pipe 29 terminates in a tip 30 located approximately in the plane of the gas orifices 15 and comprising a circular plate countersunk in its inner face to form a convergent spray nozzle. The atomized oil issues from this nozzle in a diverging conical body which is immediately surrounded by a burning turbulent air-gas mixture formed in a zone adjacent to the burner pipes 14 and extending into the furnace enclosure.

The two-fluid atomizing nozzle of the type shown in Fig. 3 has been found particularly satisfactory in the manufacture of carbon black in that it is possible to handle successfully and in very moderate pressure hydrocarbon oils having a wide range of viscosity. For example, both gas and oil may be supplied at approximately 40 lbs. pressure to the nozzle.

It has been found important to arrange the oil nozzle or nozzles symmetrically in the design of the burner so that the heat, products of combustion and unburned oxygen are all uniformly distributed to the atomized oil zone. Otherwise the oil will be overburned and overcracked in regions of low oil concentration and just the opposite will occur in the regions of high oil concentration.

1. PREHEATED GAS ENRICHED WITH VAPORIZED OIL

Under these conditions the oil is vaporized in a separate preheater and added to the preheated gas stream supplied by the headers 16 and 17 or one of them. The vaporized oil may be supplied at a temperature of 600–750° F. depending on the character of the oil employed. 3 to 3½ lbs. of carbon black is produced per gallon of oil supplied, and the carbon black is of the same quality as that produced by the furnace employing unenriched gas; that is to say, if the furnace is producing carbon black of the SRF type when unenriched gas is employed, it will produce carbon black of the SRF type when enriched with vaporized oil. On the other hand, if it is originally producing carbon black of the HMF type, the additional carbon black made by adding oil takes on the character of the carbon black being made from gas alone under otherwise identical operating conditions.

When oil is added the temperature of the furnace is kept about the same, although it may be found desirable to increase slightly the air supply in order to provide additional heat for cracking the oil—that is, to keep the furnace temperature from being reduced when oil is added. Operating with preheated gas enriched with vaporized oil, furnace temperatures of 2300 to 2500° F. may be employed. The gas may be preheated to 800 to 1000° F. and supplied at the rate of 4000 to 5000 c. f. per burner hour. The following runs indicate a comparison of the furnace operating with and without vaporized oil:

| Oil/Gal. Hr. | Gas Temp. | Oil Temp. | Prod. # Hr. | Total Per Cent Recovered | Scale | Tensile |
|---|---|---|---|---|---|---|
| 4.10 | 1,000 | 675 | 32.1 | 18.5 | 92.6 | 126 |
| 8.10 | 1,000 | 680 | 48.4 | 24.3 | 93.8 | 123 |
| 7.43 | 800 | 675 | 50.4 | 25.9 | 95.2 | 110 |
| No oil | 800 | No | 21.5 | 14.7 | 94.5 | 126 |

2. OIL ATOMIZED AT BURNER
[Two nozzles in blank center burner pipe (5 pipe burner).]

| 3.70 | 72 | 72 | 62.8 | 9.1 | 92.6 | 129 |
|---|---|---|---|---|---|---|
| 3.50 | 1,000 | 675 | 32.3 | 20.0 | 93 | 121 |
| 6.25 | 800 | 700 | 39.6 | 15.2 | 93 | 121 |
| No oil | 72 | No | 10.9 | 8.5 | 95.8 | No |

3. OIL ATOMIZED AT BURNER
[One nozzle with ⅛″ nipple between center of 6 pipe burner.]

| 6.20 | 72 | 72 | 26.6 | 10.2 | 92.2 | 111 |
|---|---|---|---|---|---|---|
| 4.73 | 72 | 72 | 23.8 | 11.1 | 92.6 | 113 |
| 6.00 | 72 | 72 | 38.2 | 13.8 | 94. | 117 |
| 6.05 | 72 | 700 | 29.8 | 11.4 | 93.1 | 92 |
| No oil | 72 | 72 | 7.6 | 3.5 | 87.0 | 100 |

4. OIL PRESSURE ATOMIZED
[One nozzle with ⅛″ nipple between center of 6 pipe burner.]

| Oil/Gal. Hr. | Gas Temp. | Oil Temp. | Prod. # Hr. | Total Per Cent Recovered | Scale | Tensile |
|---|---|---|---|---|---|---|
| 7.00 | 72 | 72 | 45.8 | 22.8 | 94.1 | 114 |
| 8.96 | 72 | 72 | 51.9 | 29.3 | 95.7 | 128 |
| No oil | 72 | 72 | 22.4 | 15.3 | 94.0 | 123 |

5. OIL ATOMIZED IN 2-FLUID SPRACCO NOZZLE
[Nozzle at center of 6 pipe burner.]

| 4.21 | 1,000 | 700 | 20.3 | 11.7 | 90.7 | 132 |
|---|---|---|---|---|---|---|
| 3.91 | 800 | 700 | 32.8 | 18.5 | 95.5 | 100 |
| 4.14 | 600 | 700 | 36.4 | 20.8 | 94.7 | 122 |
| No oil | 1,000 | No | 5.6 | 3.8 | 88.6 | |

In each of the series of runs above listed, the first column indicates the gallons of oil per hour supplied to the burner by nozzles located in the manner described. The second column shows the temperature of the gas, this being sometimes preheated to from 600 to 1000° F. and sometimes supplied unheated at about 72° F. The third column shows the temperature of the oil, this being sometimes preheated to from 675 to 700° F. and sometimes supplied unheated at about 72° F. The fourth column indicates the production of carbon blank in pounds per hour, and the fifth the total percentage of carbon recovered on the calculated content of the oil-gas mixture. The sixth column shows the color of the product on the Cabot Nigrometer scale in which the lower numbers indicate the blacker color of carbon black, and the last column the tensile strength of a rubber test piece compounded with the instant sample in terms of the tensile strength of a standard test piece.

In general it may be said that when oil is supplied at a rate of approximately one gallon per thousand cubic feet of gas, an excellent quality of HMF carbon black is produced at approximately 35 lbs. per hour, thus obtaining roughly 50% of the carbon contained in the oil. The product is of the high grade HMF quality without the characteristic structure of oil blacks. There is nothing critical in the specifications of the oil to be used. In practice, we have found that oils of the nature of catalytic cycle stocks or thermal recycle stocks have been found satisfactory for our purpose. Generally speaking, a high aromatic content, say 40 to 70%, is desirable. When the vaporized oil technique is used it is advantageous to use a distillate oil; when the atomized oil technique is used it is not necessary or particularly advantageous to have a completely distillate oil.

It is desirable under certain conditions to preheat the air supplied through the duct 20 and for that purpose any suitable type of heat-interchanger may be employed and air delivered to the furnace at temperatures of 900 to 1400° F., for example. It is also advantageous to heat this gas to the higher temperatures of 1100 to 1200° F. in some cases.

Having thus disclosed my invention and described in detail different illustrative processes of carrying it out, I claim as new and desire to secure by Letters Patent:

1. A burner box for use in combination with carbon black producing furnaces, comprising a rectangular sheet metal casing having an open side, and a series of parallel perforated burner pipes disposed entirely within the casing and adjacent to its open side, the pipes being substantially oval in both internal and external cross section, disposed with their flatter sides spaced from each other and their narrower sections outwardly directed and having a multiplicity of uniformly distributed small gas orifices in the outer section of each pipe, means directing air from behind the burner pipes forwardly into the furnace in a substantially straight path through the spaces provided between the burner pipes, in combination with an atomizing chamber, a supply pipe for atomizing gas leading thereto and a discharge pipe passing transversely therefrom between the burner pipes in a direction substantially perpendicular to the plane in which the gas orifices are located and terminating in a diverging spray type nozzle located in substantially the plane of the gas orifices and substantially the center thereof, and thus arranged to deliver a diverging atomized spray of oil where it is immediately surrounded by a burning turbulent air-gas mixture as it leaves the nozzle.

2. In a burner box for use in combination with a carbon black producing furnace, a series of burner pipes arranged in adjacent parallel relation with air spaces between them, each being substantially pear-shaped in both internal and external cross section, the narrower section of each pipe being directed toward the furnace and having therein a multiplicity of spaced gas orifices approximately $\frac{5}{32}$ inch in diameter, means directing air from behind the burner pipes forwardly into the furnace in a substantially straight path through the spaces provided between the burner pipes, in combination with an atomizing chamber, a supply pipe for atomizing gas leading thereto and a discharge pipe passing transversely therefrom between the burner pipes in a direction substantially perpendicular to the plane in which the gas orifices are located and terminating in a diverging spray type nozzle located in substantially the plane of the gas orifices and substantially the center thereof, and thus arranged to deliver a diverging atomized spray of oil where it is immediately surrounded by a burning turbulent air-gas mixture as it leaves the nozzle.

3. The process of making furnace carbon black, which includes the steps of admitting a relatively large body of air, divided into several separate parallel sheets of air, into an elongated unrestricted combustion space, injecting into the combustion space a multiplicity of small jets of carbon-containing gas arranged in rows between adjacent air sheets, flowing the jets of gas in the same general direction as the air sheets and passing directly and in a well distributed manner into the air at such higher velocity than that of the air as to establish an immediate and localized turbulent mixture of air and gas about the jets under conditions of incomplete combustion, thereby decomposing the unconsumed gas while in free space, injecting into said mixture in a substantially central position with respect to the pattern of gas jets a fine spray of hydrocarbon oil which has been atomized by gas in a diverging conical body which is immediately surrounded by a burning turbulent air-gas mixture, and collecting the unburned carbon particles from the products of combustion.

4. The process defined in claim 3 further characterized by the fact that the gas is injected at a velocity of at least twice that of the air, and the spray of hydrocarbon oil is initiated in substantially the same plane as the gas jets.

5. The process defined in claim 3 further characterized by the fact that the parallel sheets of air are of substantially equal volume and flow in a horizontal direction, and that the gas and oil are preheated to a substantial degree.

6. The process defined in claim 3 in which the gas, the air and the oil are all preheated to a substantial degree.

WILLIAM L. LOVING.

REFERENCES CITED

The following references are of record in the file of this patent:

UNITED STATES PATENTS

| Number | Name | Date |
|---|---|---|
| 1,950,015 | Winder et al. | Mar. 6, 1934 |
| 2,039,981 | Pembert | May 6, 1936 |
| 2,375,797 | Krejci | May 15, 1945 |
| 2,418,475 | Loving | Apr. 8, 1947 |
| 2,462,026 | Loving | Feb. 15, 1949 |